(12) United States Patent
Convery et al.

(10) Patent No.: US 10,289,444 B2
(45) Date of Patent: May 14, 2019

(54) CLIENT CONTROLLED TRANSACTION PROCESSING INVOLVING A PLURALITY OF PARTICIPANTS

(71) Applicant: INTERNATIONAL BUSINESS MACHINES CORPORATION, Armonk, NY (US)

(72) Inventors: Robert M. Convery, Hursley (GB); Andrew S. Edwards, Hursley (GB); Martin R. Holder, Hursley (GB); Michael J. Tunnicliffe, Hursley (GB); Shanna Xu, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 14/874,529

(22) Filed: Oct. 5, 2015

(65) Prior Publication Data

US 2017/0097847 A1 Apr. 6, 2017

(51) Int. Cl.
*G06F 9/46* (2006.01)
*G06F 17/30* (2006.01)

(52) U.S. Cl.
CPC ........ *G06F 9/466* (2013.01); *G06F 17/30377* (2013.01)

(58) Field of Classification Search
None
See application file for complete search history.

(56) References Cited

U.S. PATENT DOCUMENTS

| 7,668,833 | B2 | 2/2010 | Robinson | |
|---|---|---|---|---|
| 8,799,347 | B2 | 8/2014 | Garza et al. | |
| 2004/0215590 | A1* | 10/2004 | Kroening | G06F 9/5072 |
| 2005/0268300 | A1* | 12/2005 | Lamb | G06F 9/5038 |
| | | | | 718/100 |
| 2009/0292744 | A1* | 11/2009 | Matsumura | G06F 9/466 |
| 2011/0055834 | A1* | 3/2011 | Meda | G06F 11/1402 |
| | | | | 718/101 |

(Continued)

OTHER PUBLICATIONS

Oracle, "XA and Oracle Controlled Distributed Translations", Oracle White Paper, Jun. 2010 (29 pages).

(Continued)

*Primary Examiner* — Wynuel S Aquino
(74) *Attorney, Agent, or Firm* — Heslin Rothenberg Farley & Mesiti P.C.

(57) ABSTRACT

Methods and systems are provided for client controlled transaction processing. The method may be carried out at a transaction server, and include: receiving a transaction request from a transaction initiator and allocating a transaction identifier to the transaction; receiving notification of the number of jobs to be completed in the transaction; maintaining a transaction status indicating the current status of the transaction; receiving job status updates from one or more participants processing the jobs included in the transaction and updating a transaction record reflecting the status of each of the jobs included in the transaction; updating the transaction status when required based on the job status updates of the jobs included in the transaction; and receiving and responding to transaction status polling to provide a current transaction status, where the transaction status polling originates from the transaction initiator and the participants processing the jobs.

20 Claims, 9 Drawing Sheets

(56) References Cited

U.S. PATENT DOCUMENTS

| | | | | |
|---|---|---|---|---|
| 2012/0246651 A1* | 9/2012 | Li | ............................ | G06F 9/4843 |
| | | | | 718/101 |
| 2013/0132458 A1 | 5/2013 | Little | | |
| 2014/0019613 A1* | 1/2014 | Ishikawa | .................. | G06F 11/20 |
| | | | | 709/224 |
| 2016/0042023 A1* | 2/2016 | Leach | ...................... | G06F 9/466 |
| | | | | 707/703 |
| 2016/0306673 A1* | 10/2016 | You | ........................ | G06F 9/5038 |

OTHER PUBLICATIONS

"C5542: Topics in Distributed Systems—Distributed Transactions and Two Phase Commit Protocol", Power Point Presentation.

* cited by examiner

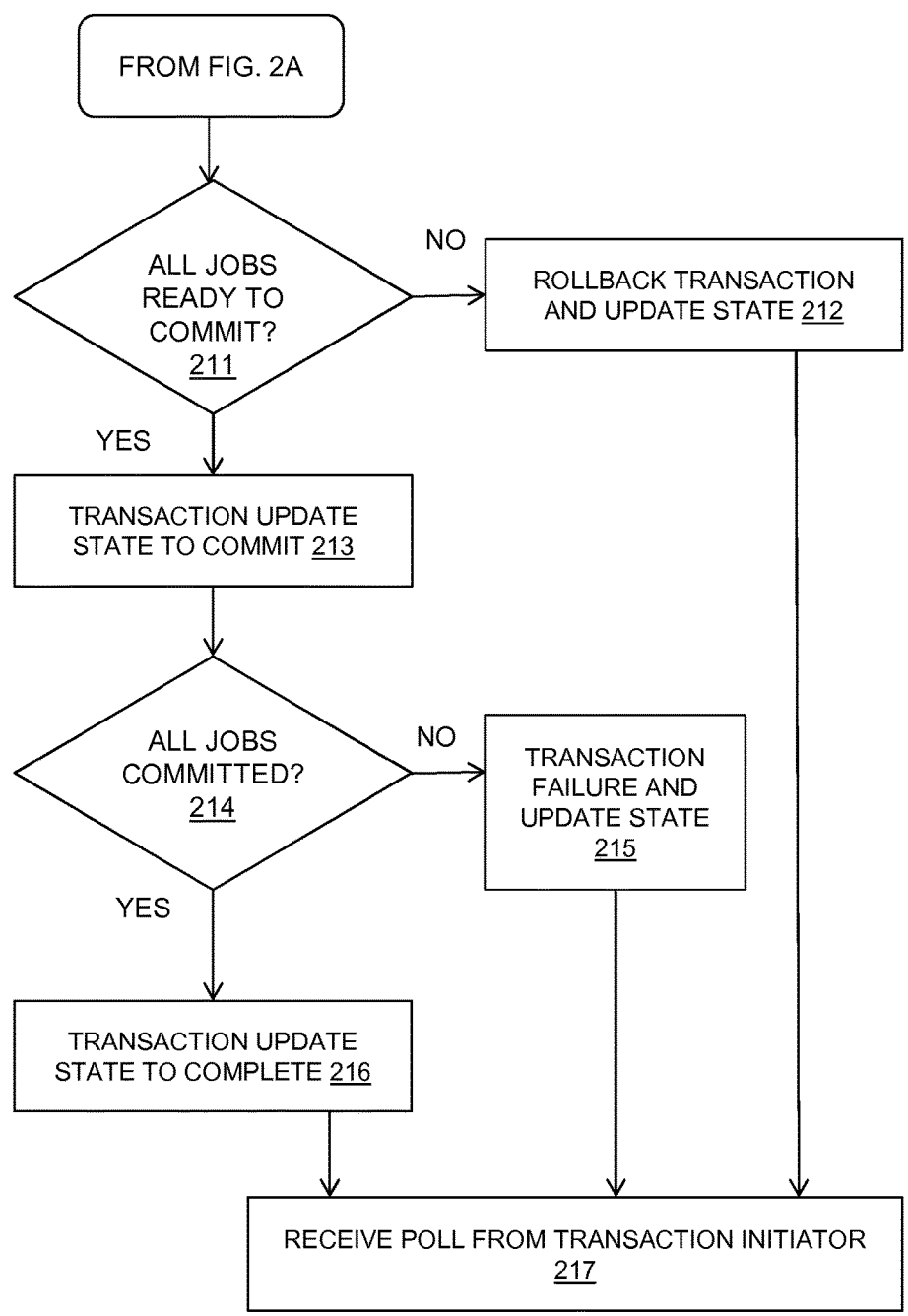

CLIENT CONTROLLED TRANSACTION PROCESSING INVOLVING A PLURALITY OF PARTICIPANTS

BACKGROUND

The present invention relates to transaction processing, and more specifically, to client controlled transaction processing involving a plurality of participants.

Transaction processing is information processing that is divided into individual operations called transactions. Each transaction must succeed or fail as a complete unit. Distributed transactions are database transactions in which two or more network hosts are involved. The hosts provide transactional resources while a transaction manager is responsible for managing the operations.

BRIEF SUMMARY

According to one or more aspects of the present invention, provided herein is a computer-implemented method for client controlled transaction processing carried out at a transaction server. The computer-implemented method includes: receiving a transaction request from a transaction initiator and allocating a transaction identifier to the transaction; receiving notification of a number of jobs to be completed in the transaction; maintaining a transaction status indicating the current status of the transaction; receiving job status updates from one or more participants processing jobs included in the transaction and updating a transaction record reflecting the status of each of the jobs included in the transaction; updating the transaction status when required based on the job status updates of the jobs included in the transaction; and receiving and responding to transaction status polling to provide a current transaction status, wherein the transaction status polling originates from the transaction initiator and the participants processing the jobs.

In one or more additional aspects, provided herein is a system for client controlled transaction processing. The system includes, for instance: a memory, and a processor in communications with the memory, wherein the system performs a method comprising: receiving a transaction request from a transaction initiator and allocating a transaction identifier to the transaction; receiving notification of a number of jobs to be completed in the transaction; maintaining a transaction status indicating the current status of the transaction; receiving job status updates from one or more participants processing jobs included in the transaction and updating a transaction record reflecting the status of each of the jobs included in the transaction; updating the transaction status when required based on the job status updates of the jobs included in the transaction; and receiving and responding to transaction status polling to provide a current transaction status, wherein the transaction status polling originates from the transaction initiator and the participants processing the jobs.

According to one or more further aspects of the present invention, provided herein is a computer program product for client controlled transaction processing carried out at a transaction server. The computer program product includes a computer readable storage medium having program instructions embodied therewith, the program instructions being executable by a processor to cause the processor to: receive a transaction request from a transaction initiator and allocating a transaction identifier to the transaction; receive notification of a number of jobs to be completed in the transaction; maintain a transaction status indicating the current status of the transaction; receive job status updates from one or more participants processing jobs included in the transaction and updating a transaction record reflecting the status of each of the jobs included in the transaction; update the transaction status when required based on the job status updates of the jobs included in the transaction; and receive and responding to transaction status polling to provide a current transaction status, wherein the transaction status polling originates from the transaction initiator and the participants processing the jobs.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention are described below, by way of example only, with reference to the drawings in which:

FIGS. 2A and 2B show a flow diagram of one embodiment of a method, in accordance with one or more aspects of the present invention;

It will be appreciated that for simplicity and clarity of illustration, elements shown in the FIGS. have not necessarily been drawn to scale. For example, the dimensions of some of the elements may be exaggerated relative to other elements for clarity. Further, where considered appropriate, reference numbers may be repeated among the FIGS. to indicate corresponding or analogous features.

DETAILED DESCRIPTION

A transaction system and method are described herein by way of example that use a two-phase commit style protocol, where communication is initiated by the participants. The participants communicate with a central server. The central server does not need to initiate a connection to any participant, and the participants do not need to communicate with each other or with the entity that initiates the transaction. This allows transactions to be offered in a network where the existence and location of any potential participants is not assured. It also means that the number of possible participants can be scaled elastically as required by the work load.

The state of the transaction, and of the participants within that transaction, is held within the central transaction server. The participants either report their status to the central transaction server or poll the transaction server for the transaction state.

This effectively allows transaction coordination to be offered as a service where the transaction coordinator and the participants in the transaction can all exist in a cloud environment.

Figure 1:
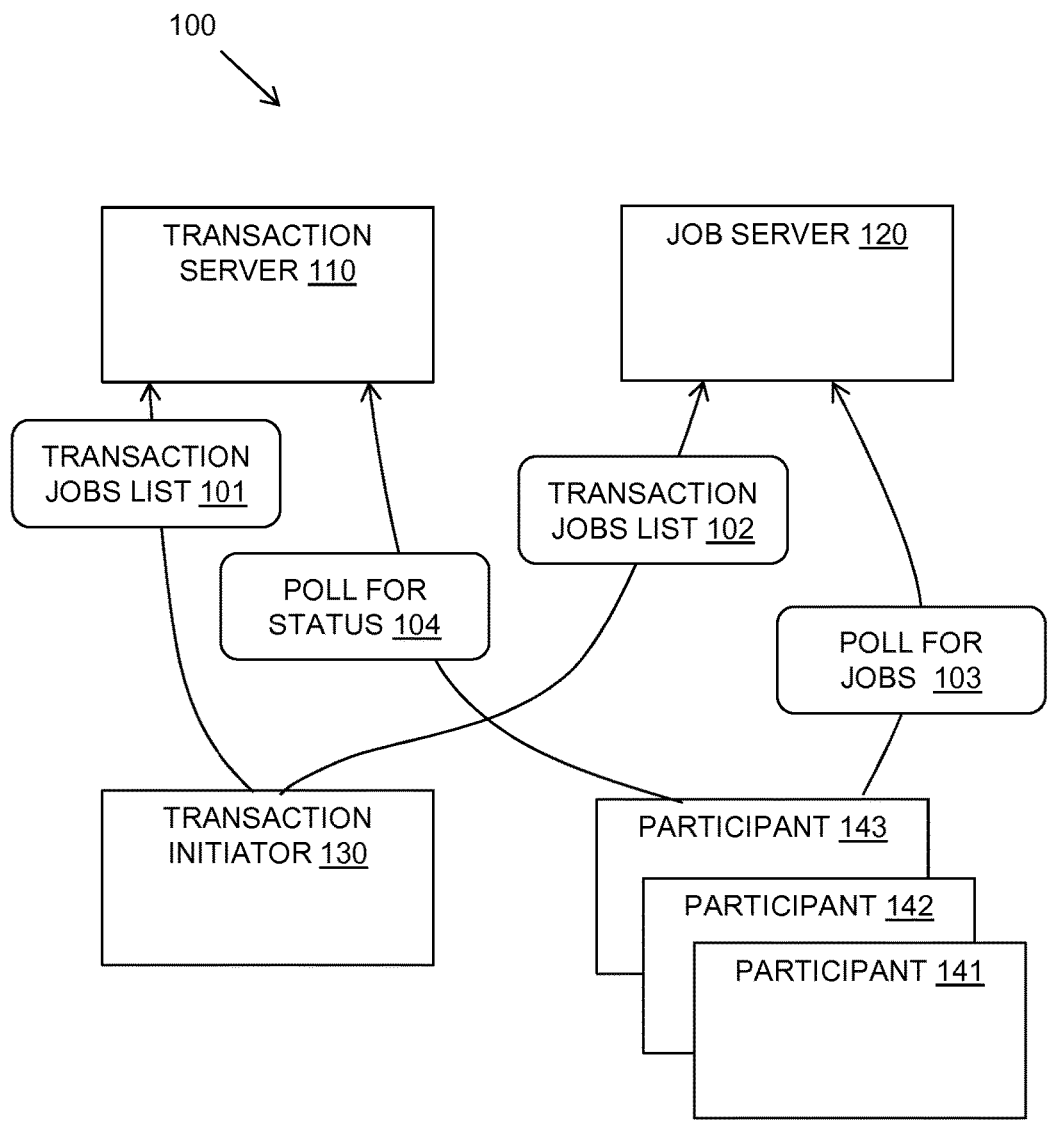
FIG. 1 is block diagram of one embodiment of a system, in accordance with one or more aspects of the present invention.

Referring to FIG. 1, a block diagram is provided showing an example embodiment of a distributed transaction system 100.

A transaction server 110 may be provided as a central server that coordinates a transaction. A job server 120 may be provided and may be located within the same logical server as the transaction server 110 or may be separate and in communication with the transaction server 110. The job server 120 may contain information on the tasks or jobs that need to be fulfilled by the participants.

A transaction initiator 130 may be a client or application program that requests a series of jobs to be completed under a transaction. Transaction initiator 130 may only require the ability to communicate over a non-persistent/stateless channel.

A set of one or more participants 141-143 may be provided capable of fulfilling jobs presented by job server 120. A participant 141-143 may only require the ability to communicate over a non-persistent/stateless channel, and may be or include, for instance, a resource manager that has the ability to commit or rollback a job.

In the described methods and systems, transaction initiator 130 may send a message 101 to transaction server 110 to create a transaction with a specified number of jobs. Transaction initiator 130 may also send a message 102 to job server 120 defining the specified number of jobs.

The participants 141-143 may poll 103 job server 120 for jobs to process. The participants 141-143 may also poll 104 transaction server 110 for the status of a transaction for which they have a job. In this way, the participants 141-143 control the communications with transaction server 110, and transaction server 110 does not need to provide outgoing communications with individual participants 141-143.

Transaction initiator 130 specifies the number of jobs, and therefore transaction initiator 130 does not need to specifically end a transaction as, once the specified number of jobs are completed, transaction server 110 may end the transaction. Transaction initiator 130 polls transaction server 110 for the status of the transaction.

Figure 2A:
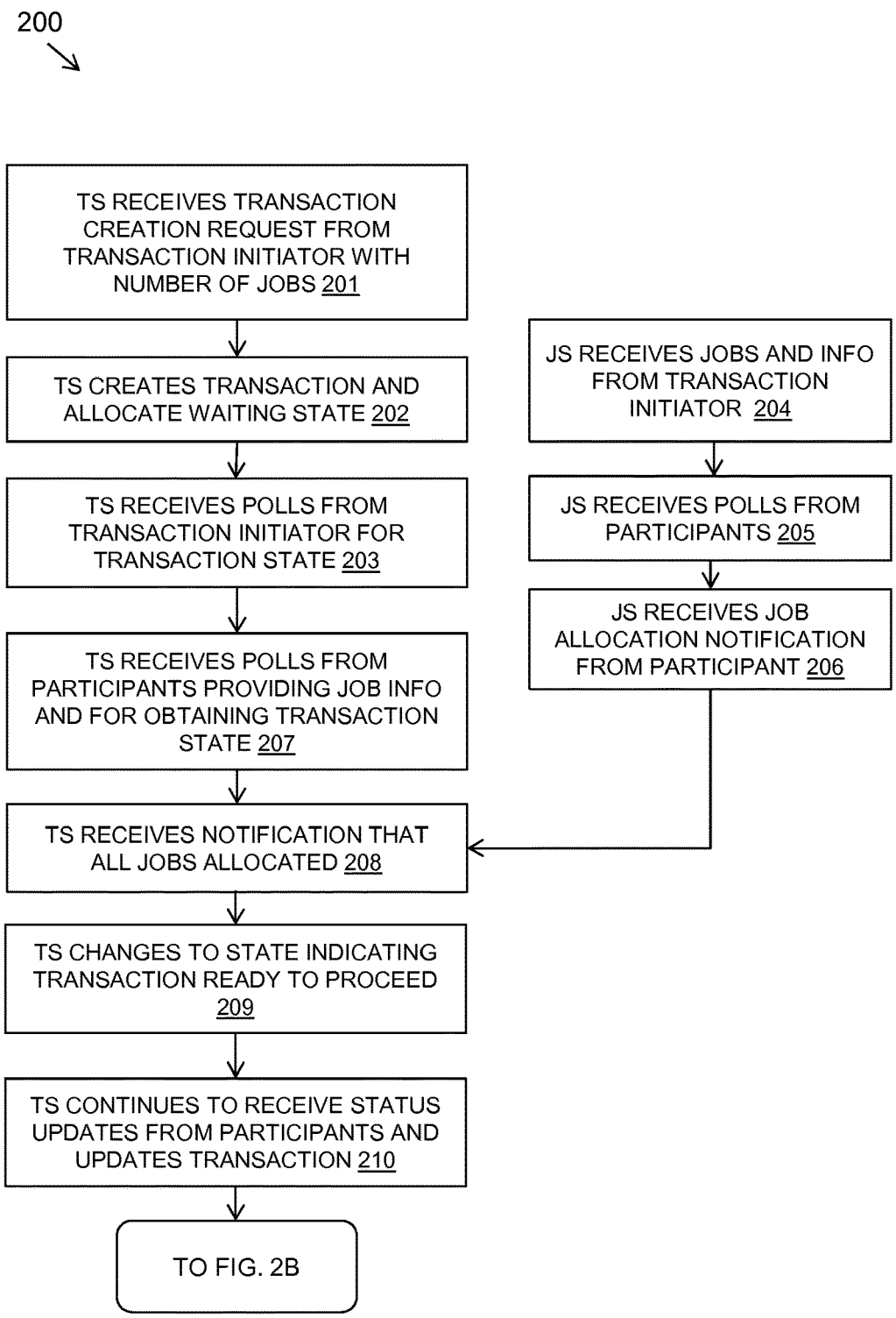

Referring to FIGS. 2A and 2B, a flow diagram 200 is provided illustrating an exemplary embodiment of the above-described method, as carried out at a transaction server and job server.

The transaction server (TS) may receive 201 a transaction creation request from a transaction initiator including a specified number of jobs within the transaction.

The transaction server may create 202 the transaction with a transaction identifier and an associated number of jobs in the transaction. The transaction server may allocate a waiting state to the transaction which may remain the state until such time as all the jobs in the transaction have been allocated.

The transaction server may receive polls 203 from the transaction initiator for updates on the state of the transaction.

The job server may meanwhile receive 204 a message defining jobs to be completed from the transaction initiator, which may include all the information required by a participant to perform the work. Each job has a job identifier and is associated with the transaction identifier.

The job server may receive 205 regular polls from participants looking for a job to complete and makes this information available to the participants. The job server may receive 206 a message from a participant with a job identifier indicating that the job has been assigned to the participant. The job server may mark the job as assigned.

The transaction server may receive 207 polls from one or more participants which provide information on the job being carried out by the participant and to obtain the current state of the transaction for which they have an assigned job.

The transaction server may receive 208 a message from the job server indicating that all jobs for a transaction have been assigned. Alternatively, the transaction server may deduce this when it receives polls from the allocated participants for all the number of jobs of the transaction.

The transaction server may change 209 the state of the transaction to a state to indicate that the transaction is ready to proceed. The received polls from the participants are advised of the new state.

The transaction server may continue to receive 210 status updates from the participants and may update the jobs in the transaction according to the received status updates.

It may be determined 211 if all the jobs are ready to commit. If the transaction server receives any error statuses from the participants, the transaction server may rollback 212 the transaction and may change its state accordingly.

If the transaction server receives a commit ready message for all the jobs in a transaction from all the allocated participants, the transaction server may change 213 its status to a state indicating that the participants should all commit their jobs.

It may be determined 214 if all the jobs are committed. If the transaction server receives any commit failure statuses from the participants, the transaction server may set 215 the state to transaction failure.

If the transaction server receives a commit done message for all the jobs in a transaction from all the allocated participants, the transaction server may change 216 its state to indicate that the transaction is complete A poll received 217 from the transaction initiator will be advised of the transaction completion, the transaction failure, or the commit rollback.

A more detailed embodiment is next described, by way of example only. Note that the following transaction states are defined, which describe the discrete states for the individual participants and the transaction as a whole.

A transaction within a transaction server 110 (TS) may have the following states:
TS_WAIT—A transaction exists, but not all of the jobs have been assigned;
TS_READY—All jobs in a transaction are assigned and participants can commence their work;
TS_GOCOMMIT—All participants have completed the work in their job and are ready to commit;
TS_DONE—All participants have committed their job, transaction is complete;
TS_ROLLBACK—Something has gone wrong before the transaction reached TS_GOCOMMIT;
TS_FAILURE—Something has gone wrong from state TS_GOCOMMIT to TS_DONE. This is a critical disaster-recovery scenario as some work may have been committed by this point.

A participant 141-143 (P) within a transaction may have the following states:

P_READY—Participant is ready to start the work in the job;

P_COMMITREADY—The participant has performed its task and is ready to commit;

P_DONE—The participant has committed the work;

P_ERROR—Something went wrong within the participant before being P_COMMITREADY;

P_COMMITFAIL—Something went wrong within the participant moving from state P_COMMIT to P_DONE. This will trigger a critical disaster-recovery scenario as it means that a commit has failed.

Figure 3:
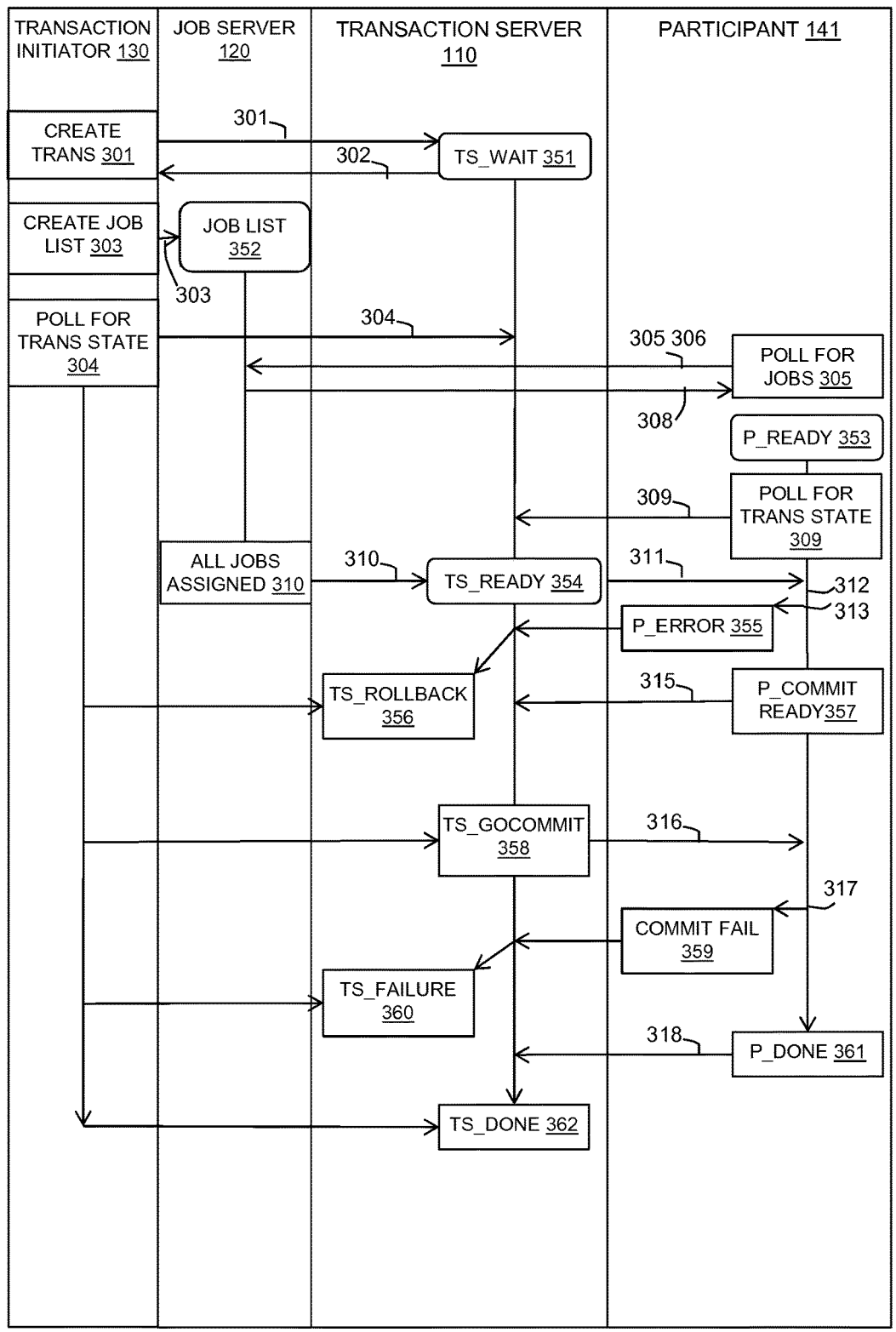
FIG. 3 is a flow diagram of an exemplary embodiment of a method, in accordance with one or more aspects of the present invention.

Referring to FIG. 3, a multi-lane flow diagram 300 is provided showing an example embodiment of a method between the components of FIG. 1, including a transaction initiator (TI) 130, a job server (JS) 120, and a transaction server (TS) 110, and a participant (P) 141 using the above-defined states.

TI has a batch of jobs to be performed under a transaction. TI sends 301 a message to TS to create a transaction with a specified number of jobs. TS creates a transaction in state TS_WAIT 351, and associates the number of jobs in that transaction. TS responds 302 to TI with a transaction ID.

TI creates and sends 303 a message to JS defining the jobs to be completed in a Job List 352. This includes all information required by a participant to perform the work. Each job is given a job ID and associated with the transaction ID. The TI then starts to regularly poll 304 the TS for the state of the transaction.

Each P 141 is regularly polling 305 JS. P can either send a list of the type of jobs it can complete or receive a list of the types of jobs available.

When P identifies a job it can complete, it sends 306 JS a message with the job ID and a message to say that the job has been assigned. JS then marks the job as assigned and does not allow any other P to take that job. JS returns 308 a success message and the transaction ID to the participant putting the participant in the state P_READY 353 or returns a failure message if the job is no longer available.

On successfully assigning a job, the participant then starts to regularly poll 309 the TS, sending their status.

Once all jobs have been assigned, the JS may send 310 a message to the TS saying that all jobs for that transaction ID have been assigned. Alternatively, the TS may deduce that all the jobs have been allocated by the polls received from the participants. This puts the transaction in the state TS_READY 354. The coordinated start allows for the taking of locks to be delayed until all the participants are ready to go.

As an alternative embodiment at this stage, there may be removal of the READY co-ordination point and participants may start their job when ready without waiting for the TS_READY status from the transaction server.

The next time a participant polls the TS, it receives a response 311 saying that the transaction is in the state TS_READY. The participants then perform 312 their work and upon completion they change to state P_COMMITREADY 357. The participants then start to regularly poll the TS, sending their status. If any participant fails 313 to perform their work then it changes to state P_ERROR 355.

Once all participants have sent 315 a P_COMMITREADY 357 message, the TS sets the transaction state to TS_GOCOMMIT 358. If any participant sends a state of P_ERROR 355, then the TS sets the transaction to state TS_ROLLBACK 356 and the transaction fails.

Once the transaction is in state TS_GOCOMMIT 358, the next time a participant polls, it is send a response 316 to commit its work. If the commit works, the participant changes to state P_DONE 361. If the commit fails, the participant changes to state P_COMMITFAIL 359.

Once all participants have sent 318 a P_DONE 361 message, the TS sets the transaction to state TS_DONE 362.

If any participant sends 317 a state of P_COMMITFAIL 359 then the transaction is set to state TS_FAILURE 360 and the transaction fails.

In this situation, the process example is complete, with all but one of the participants having committed the transaction and one having failed. The participants that have committed the transaction are unaware of a problem. In this situation, one of two things can happen:

1. Manual intervention may be required to either undo the successful participants or fix the failing participant. This may be the only solution if a participant never recovers (or does not recover within a set time limit).

2. The more common requirement is that the failing participant is told to complete the transaction once it comes back online. This requires two further capabilities:

A That when a participant is in the P_COMMITREADY state, it must also have recorded the new state of the resources it controls, and that the new state is not yet committed (i.e. that the transaction is in P_COMMITREADY).

B That when a participant starts, it can recover any pre-existing transactions that are in the P_COMMITREADY state.

Note that the participant that recovers the transaction may not be the "same" participant. It may be a new instance on a different computer system, or a pre-existing participant with the ability to do the same job as the failing participant (for example, they may both work as database interfaces).

When the TI polls TS and gets a state of TS_DONE 362, it knows that the work has been completed under a transaction. If it receives a state of TS_ROLLBACK 356 or TS_FAILURE 360 it knows that the work is not complete and that there has been a failure.

In this system, the existence of a specific individual participant is not required, only a participant that can complete a job. In fact, the participant instances can be scaled as the load increases.

This system does not require direct communication between the transaction initiator and the individual participants, and it does not require the transaction server to be able to initiate communication with the participants. This means that the system can be used in scenarios where communications are unreliable, such as where the participants are physically mobile and may move in and out of zones of reliable signal.

In the event of a transaction server failure, the transaction server only needs to maintain its internal state (its knowledge of transactions and their participants) and for this to be logged and recoverable when the transaction server restarts. In the disclosed system, there is no need to re-engage with the participants as communication is driven by the participants. There is no persistent connection between the transaction server and the participants and the transaction server never initiates communication with a participant.

When a participant contacts the transaction server, but fails to connect (due to the transaction server being unavailable/down), the participant is unable to report its status. The participant can have a timeout value such that if it cannot report it's success within that time, the participant rolls back it's local transaction and acts as if it has reported a "P_ERROR" event.

Similarly, the transaction server may have a transaction timeout value such that if any participant has not reported it's status within that time, the transaction server can mark the transaction as needing to be rolled back and act as if a TS_ROLLBACK event has happened. Any participants that do not contact the transaction server will rollback due to their own rollback and any participants that contact the transaction server will be told that the transaction has rolled back when they next report to the transaction server.

Both timeout values may be a property of the participants themselves, the transaction server itself, or set up by the transaction initiator at the creation time of the transaction.

Alternatively, the transaction server may recover and restart successfully such that the participants only see a transient inability to connect to the transaction server. In this case, the transaction server recovers before any participant locally rolls back it's transaction and the overall transaction can complete successfully.

Figure 4:
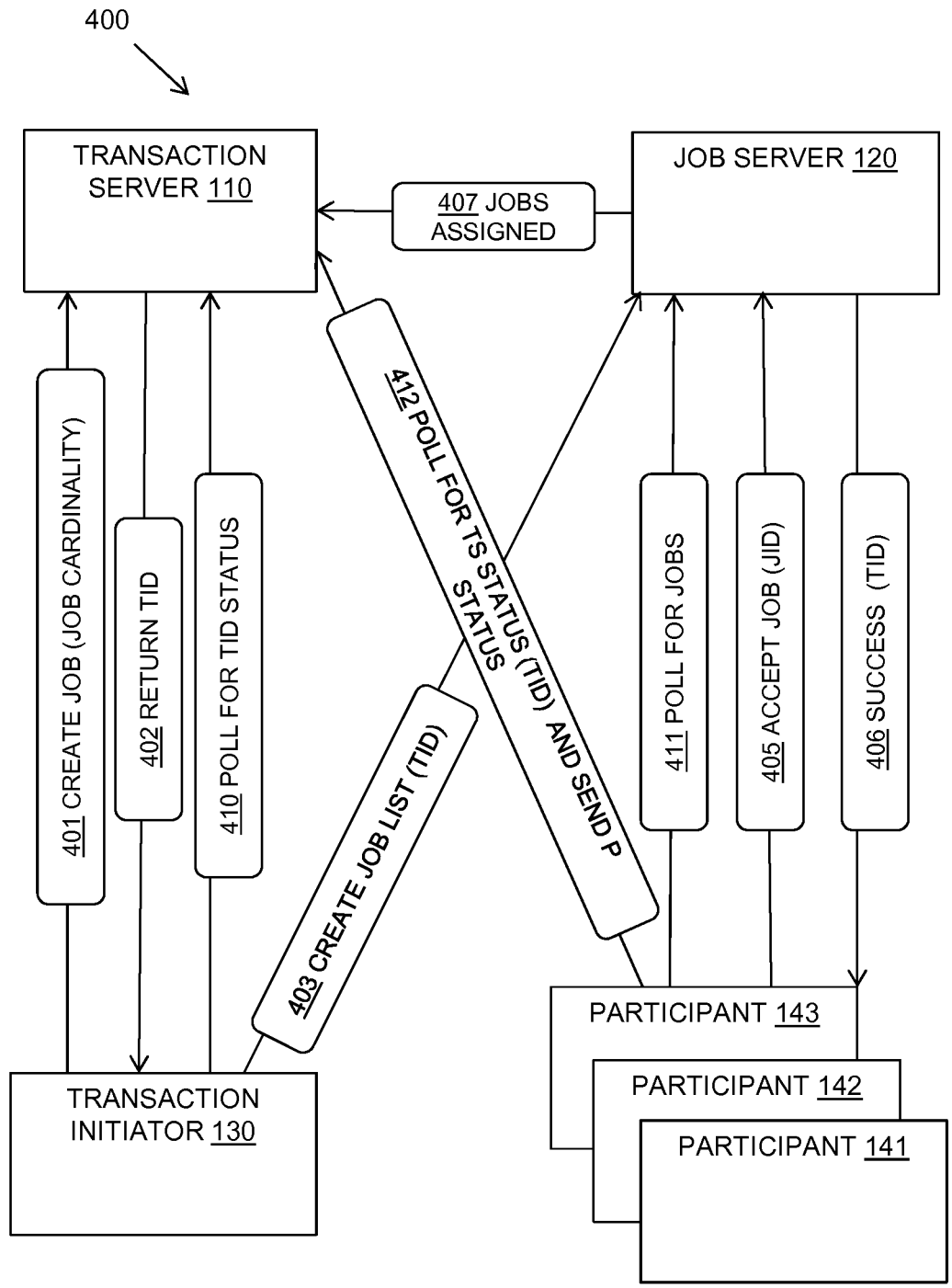
FIG. 4 shows a block diagram of the system of FIG. 1, and a flow of the method of FIG. 3, in accordance with one or more aspects of the present invention.

Referring to FIG. 4, the system of FIG. 1 shown, along with the processing flow of FIG. 3.

As shown, the transaction initiator 130 sends 401 a create job request to the transaction server 110 including job cardinality. The transaction server 110 responds to the transaction initiator 130 with a transaction identifier (TID). The transaction initiator 130 then polls 410 the transaction server 110 regularly for status updates on the transaction using the TID.

The transaction initiator 130 sends a request 403 to create a job list for the TID to a job server 120. Participants 141-143 may poll 411 the job server 120 regularly for jobs that they can process. A participant 141 may send a request to accept 405 a job to the job server 120 using a job identifier (JIB). The job server 120 may respond 406 with a success message and including the transaction identifier (TID) for the job.

The participant 141 regularly, or after a given event at the participant, polls 412 the transaction server 110 to receive updates of the transaction server 110 status for the TID and to provide updates of the job status at the participant.

In this way, the participants 141-143 instigate the communications with the transaction server 110 by polling for status updates of the transaction and to provide status updates of their job. The transaction initiator 130 polls the transaction server 110 for status updates of the transaction in order to find out if the transaction has been completed, failed or rolled back.

Figure 5:
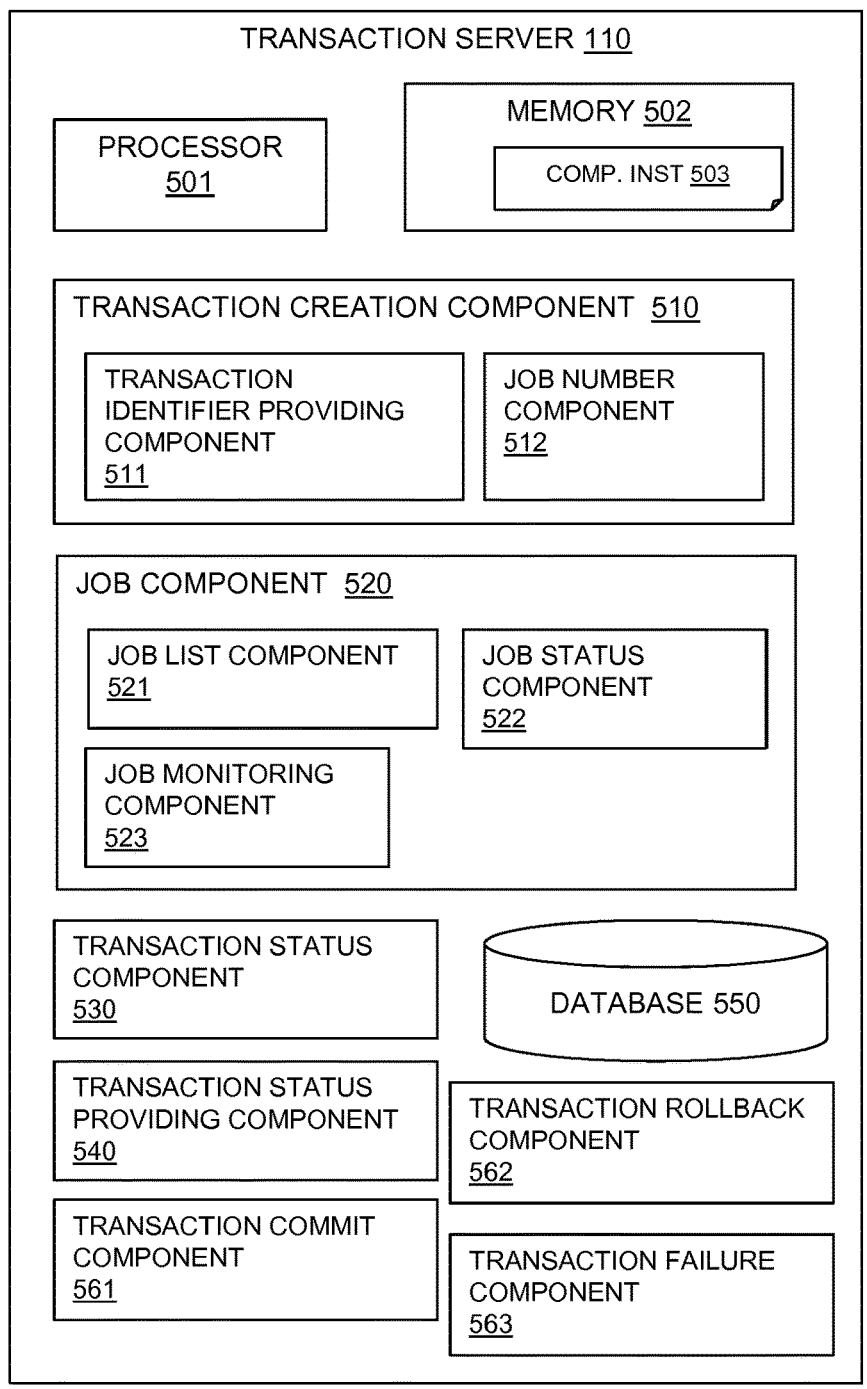
FIG. 5 is block diagram of an exemplary embodiment of a system, in accordance with one or more aspects of the present invention.

Referring to FIG. 5, a block diagram shows an example embodiment of the described system components of the transaction server 110.

Transaction server 110 may include at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The transaction server 110 may also include a transaction creation component 510 including a transaction identifier providing component 511 and a job number component 512 for recording a number of jobs or tasks in a transaction.

A job component 520 may include a job list component 521, which may receive a job list from a job server 120, including job identifiers. The job component 520 may include a job status component 522, which may be updated to include job status updates for each job as received from participants and referenced by the job identifiers. A job monitoring component 523 may be included in the job component 520 to monitor the job status updates and change the transaction status accordingly.

A transaction status component 530 may update the status of a transaction further to job status updates received from the participants as monitored by the job monitoring component 523.

A transaction status providing component 540 may be provided for providing status updates for a transaction to a transaction initiator and to participants by referencing the transaction identifier.

A database component 550 may store a transaction identifier, references to the job identifiers within the transaction, the status of each job, and the status of the transaction.

A transaction commit component 561, a transaction rollback component 562, and a transaction failure component 563 may be provided for handling the transaction with corresponding updates to the transaction status.

Figure 6:
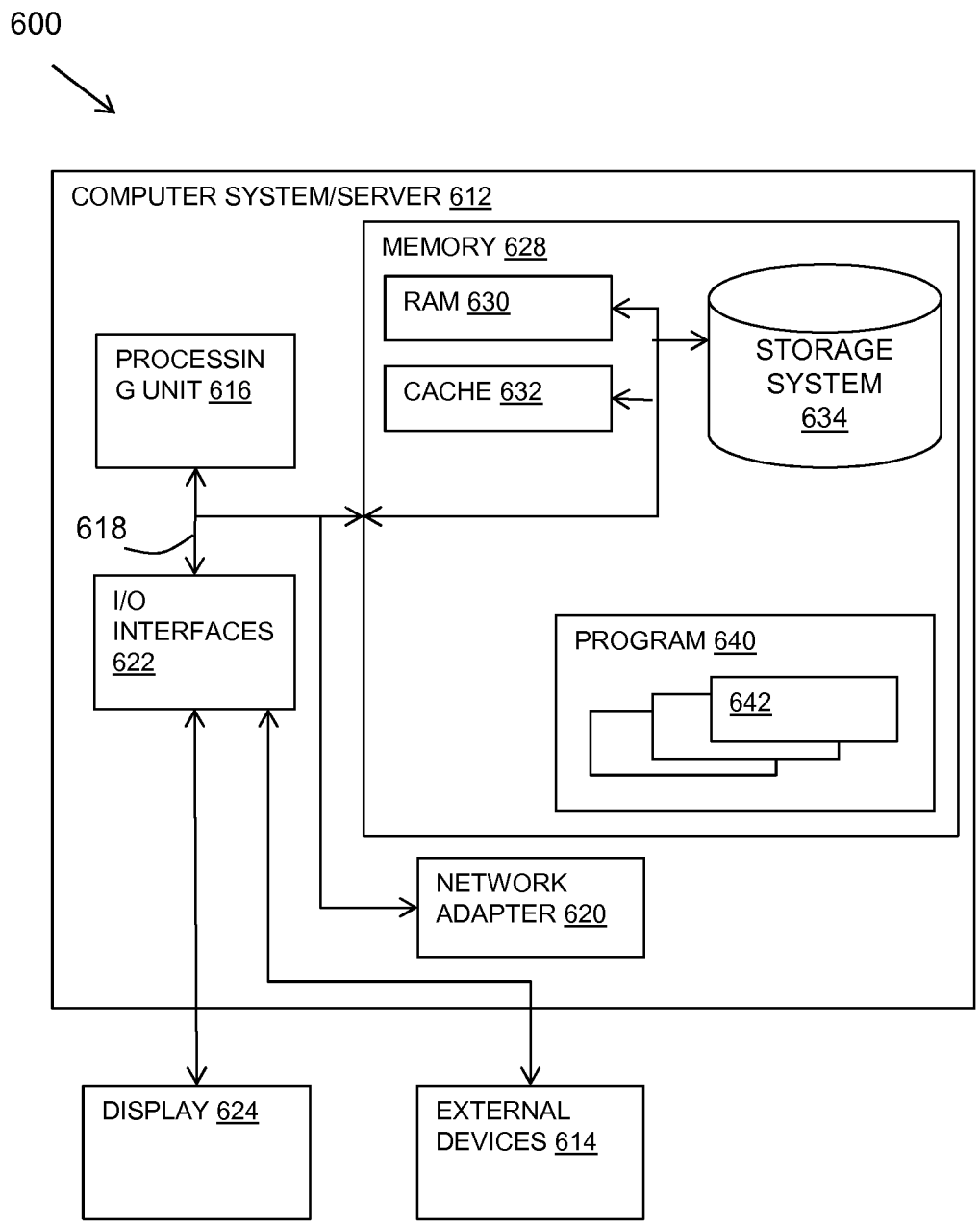
FIG. 6 is a block diagram of one embodiment of a computer system or cloud server, in which one or more aspects of the present invention may be implemented.

A computing system for implementing aspects of the described system may be provided as described with regard to FIG. 6 which is given in the context of cloud computing implementations but may equally be adapted for non-cloud computing implementations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of computer system or server is shown which may be implemented as a cloud computing node 600.

Cloud computing node 600 is only one example of a suitable cloud computing node and is not intended to suggest any limitation as to the scope of use or functionality of embodiments of the invention described herein. Regardless, cloud computing node 600 is capable of being implemented and/or performing any of the functionality set forth hereinabove.

In cloud computing node 600 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 600 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Figure 7:
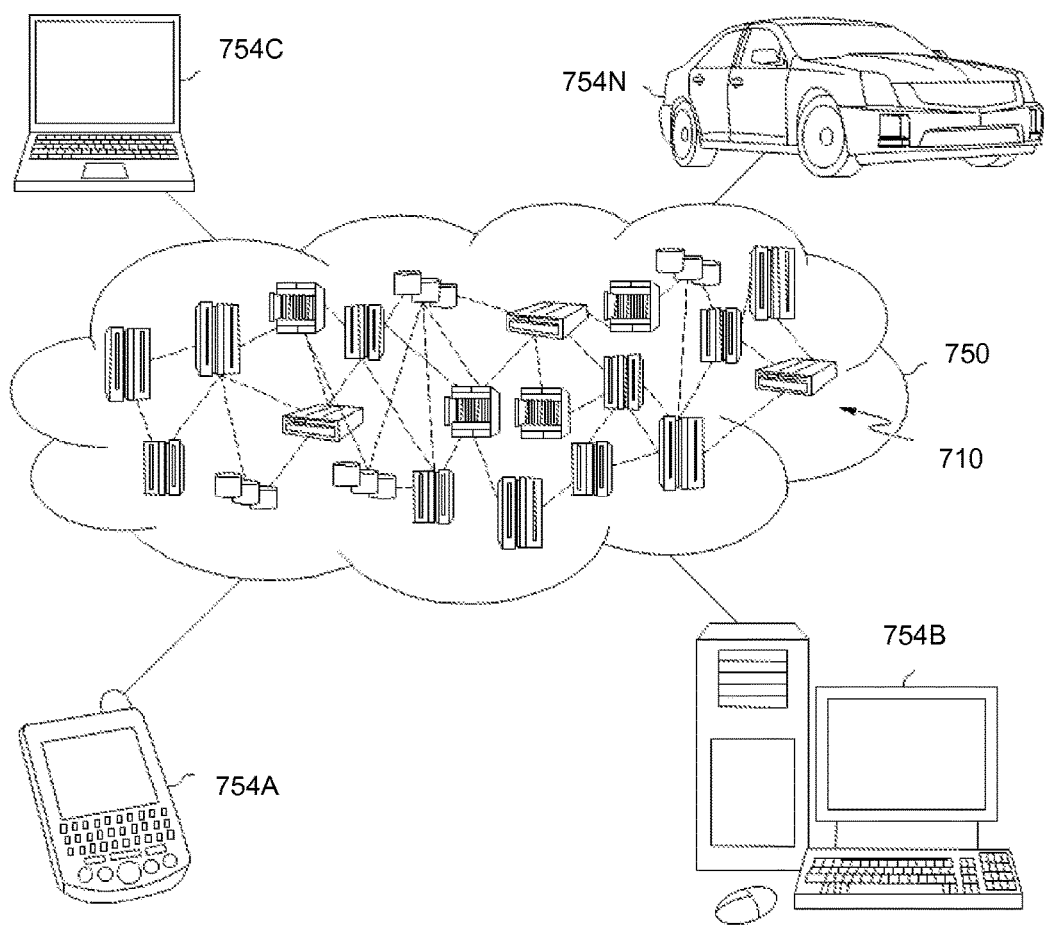
FIG. 7 is a schematic diagram of a cloud computing environment, in which one or more aspects the present invention may be implemented.

Referring now to FIG. 7, illustrative cloud computing environment 750 is depicted. As shown, cloud computing environment 750 comprises one or more cloud computing nodes 700 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
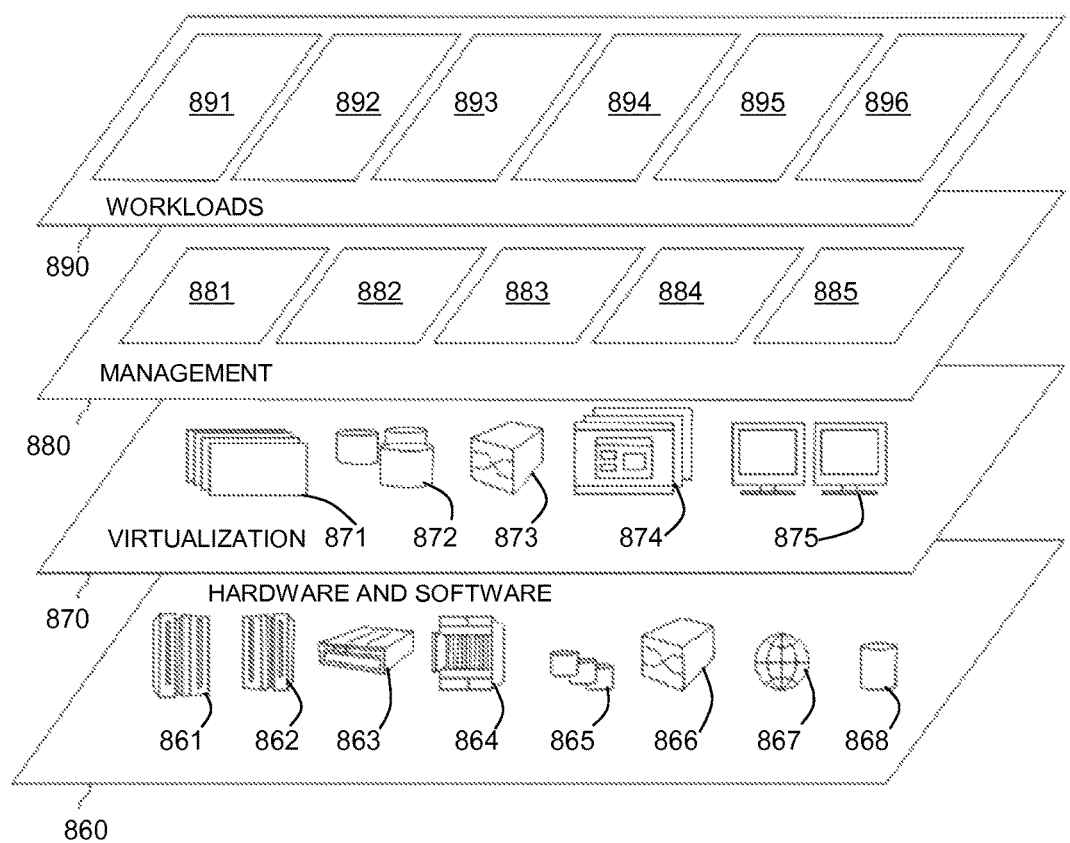
FIG. 8 is a diagram of abstraction model layers of a cloud computing environment, in which one or more aspects the present invention may be implemented.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; and transaction processing 895 including as described herein; and other functionality 896 as required such as a job server.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for client controlled transaction processing carried out at a transaction server, comprising:

receiving, at the transaction server, a transaction request from a transaction initiator and allocating a transaction identifier to a transaction;

receiving, at the transaction server, notification of a specified number of jobs in the transaction;

maintaining, at the transaction server, a transaction status indicating a current status of each of the jobs included in the transaction, and based thereon, a current status of the transaction;

receiving, at the transaction server, job status updates from one or more participants obtaining and processing jobs included in the transaction and updating a transaction record reflecting the current status of each of the jobs included in the transaction, the one or more participants processing jobs being separate from the transaction server, and the one or more participants obtaining jobs to process by polling for jobs to process;

updating, at the transaction server, the transaction status when required based on the job status updates from the one or more participants of the jobs included in the transaction;

receiving, at the transaction server, and responding to transaction status polling to provide a current transaction status based on the transaction record reflecting the current status of each of the jobs included in the transaction at time of receiving the transaction status polling at the transaction server, wherein the transaction status polling originates from the transaction initiator and the one or more participants processing the jobs included in the transaction, wherein the transaction server and the transaction initiator do not initiate polling by or other communication with the one or more participants processing the jobs included in the transaction; and recovering, at the transaction server, each of the jobs included in the transaction, based on the transaction status maintained at the transaction server, subsequent to a transaction server failure, without re-engaging with the one or more participants.

2. The computer-implemented method of claim 1, further comprising obtaining jobs by the one or more participants and providing an initial transaction status of a wait transaction status when creating the transaction, and wherein receiving transaction status polling from participants during the wait transaction status indicates to the participants to wait and not to start their allocated jobs.

3. The computer-implemented method of claim 1, wherein receiving notification of the number of jobs to be completed in the transaction includes receiving a list of jobs once all the jobs have been allocated to participants, and wherein the method further comprises updating the transaction status to a ready transaction status in response to receiving a list of jobs, and wherein responding to transaction status polling from participants during the ready transaction status indicates to the participants to start their allocated jobs.

4. The computer-implemented method of claim 1, further comprising obtaining jobs by the one or more participants and updating the transaction status to a rollback transaction status in response to receiving job status updates for at least one job status of an error status, and wherein responding to transaction status polling from participants during the rollback transaction status indicates to the participants to rollback their allocated jobs.

5. The computer-implemented method of claim 1, further comprising obtaining jobs by the one or more participants and updating the transaction status to a commit transaction status in response to receiving job status updates for all the job statuses of a commit ready status, and wherein responding to transaction status polling from participants during the commit transaction status indicates to the participants to commit their allocated jobs.

6. The computer-implemented method of claim 5, further comprising, in response to receiving one or more job status updates of a commit fail status, keeping the transaction status as a commit transaction status until a commit done status is received for the one or more job status updates or there is a manual intervention.

7. The computer-implemented method of claim 1, further comprising updating the transaction status to a failure transaction status in response to receiving job status updates for at least one job status of a commit fail status.

8. The computer-implemented method of claim 1, further comprising updating the transaction status to a completed transaction status in response to receiving job status updates for all job statuses of a commit done status.

9. The computer-implemented method of claim 1, further comprising receiving transaction status polling originating from the transaction initiator, and when the transaction status comprises one of: transaction complete, transaction rollback or transaction failure, informing the transaction initiator of an outcome of the transaction.

10. The computer-implemented method of claim 1, further comprising carrying out at a job server assisting with the transaction:
receiving a list of jobs and associated information from the transaction initiator;
receiving job seeking polls from the one or more participants;
receiving a job allocation request from a participant of the one or more participants specifying a job identifier; and
sending a job allocation confirmation including the transaction identifier to the participant specifying the job identifier.

11. A system for client controlled transaction processing, comprising:
a memory; and
a processor in communications with the memory, wherein the system performs a method comprising:
receiving, at the transaction server, a transaction request from a transaction initiator and allocating a transaction identifier to a transaction;
receiving, at the transaction server, notification of a specified number of jobs in the transaction;
maintaining, at the transaction server, a transaction status indicating a current status of each of the jobs included in the transaction, and based thereon, a current status of the transaction;
receiving, at the transaction server, job status updates from one or more participants obtaining and processing jobs included in the transaction and updating a transaction record reflecting the current status of each of the jobs included in the transaction, the one or more participants processing jobs being separate from the transaction server, and the one or more participants obtaining jobs to process by polling for jobs to process;
updating, at the transaction server, the transaction status when required based on the job status updates from the one or more participants of the jobs included in the transaction;
receiving, at the transaction server, and responding to transaction status polling to provide a current transaction status based on the transaction record reflecting the current status of each of the jobs included in the transaction at time of receiving the transaction status polling at the transaction server, wherein the transaction status polling originates from the transaction initiator and the one or more participants processing the jobs included in the transaction, wherein the transaction server and the transaction initiator do not initiate polling by or other communication with the one or more participants processing the jobs included in the transaction; and
recovering, at the transaction server, each of the jobs included in the transaction, based on the transaction status maintained at the transaction server, subsequent to a transaction server failure, without re-engaging with the one or more participants.

12. The system of claim 11, wherein the system-performed method further comprises obtaining jobs by the one or more participants and providing an initial transaction status of a wait transaction status when creating the transaction, and wherein receiving transaction status polling from participants during the wait transaction status instructs the participants to wait and not to start their allocated jobs.

13. The system of claim 11, wherein receiving notification of the number of jobs to be completed in the transaction includes receiving a list of jobs once all the jobs have been allocated to participants, and wherein the system-performed method further comprises updating the transaction status to a ready transaction status in response to receiving a list of jobs; and wherein responding to transaction status polling from participants during the ready transaction status indicates to the participants to start their allocated jobs.

14. The system of claim 11, wherein the system-performed method further comprises obtaining jobs by the one or more participants and updating the transaction status to a rollback transaction status in response to receiving job status updates for at least one job status of an error status, and wherein responding to transaction status polling from participants during the rollback transaction status indicates to the participants to rollback their allocated jobs.

15. The system of claim 11, wherein the system-performed method further comprises obtaining jobs by the one or more participants and updating the transaction status to a commit transaction status in response to receiving job status updates for all the job statuses of a commit ready status, and wherein responding to transaction status polling from participants during the commit transaction status indicates to the participants to commit their allocated jobs.

16. The system of claim 11, wherein the system-performed method further comprises updating the transaction status to a failure transaction status in response to receiving job status updates for at least one job status of a commit fail status.

17. The system of claim 11, wherein the system-performed method further comprises updating the transaction status to a completed transaction status in response to receiving job status updates for all job statuses of a commit done status.

18. The system of claim 11, wherein the system-performed method further comprises receiving transaction status polling originating from the transaction initiator, and when the transaction status comprises one of: transaction complete, transaction rollback or transaction failure, informing the transaction initiator of an outcome of the transaction.

19. The system of claim 11, further comprising performing at a job server assisting with the transaction:
receiving a list of jobs and associated information from the transaction initiator;
receiving job seeking polls from the one or more participants;
receiving a job allocation request from a participant of the one or more participants specifying a job identifier; and
sending a job allocation confirmation including the transaction identifier to the participant specifying the job identifier.

20. A computer program product for client controlled transaction processing carried out at a transaction server, the computer program product comprising a computer readable storage medium having program instructions embodied therewith, the program instructions being executable by a processor to cause the processor to:
receiving, at the transaction server, a transaction request from a transaction initiator and allocating a transaction identifier to a transaction;
receiving, at the transaction server, notification of a specified number of jobs in the transaction;
maintaining, at the transaction server, a transaction status indicating a current status of each of the jobs included in the transaction, and based thereon, a current status of the transaction;
receiving, at the transaction server, job status updates from one or more participants obtaining and processing jobs included in the transaction and updating a transaction record reflecting the current status of each of the jobs included in the transaction, the one or more participants processing jobs being separate from the transaction server, and the one or more participants obtaining jobs to process by polling for jobs to process;
updating, at the transaction server, the transaction status when required based on the job status updates from the one or more participants of the jobs included in the transaction;
receiving, at the transaction server, and responding to transaction status polling to provide a current transaction status based on the transaction record reflecting the current status of each of the jobs included in the transaction at time of receiving the transaction status polling at the transaction server, wherein the transaction status polling originates from the transaction initiator and the one or more participants processing the jobs included in the transaction, wherein the transaction server and the transaction initiator do not initiate polling by or other communication with the one or more participants processing the jobs included in the transaction; and
recovering, at the transaction server, each of the jobs included in the transaction, based on the transaction status maintained at the transaction server, subsequent to a transaction server failure, without re-engaging with the one or more participants.

* * * * *